United States Patent [19]

Erlandsen

[11] Patent Number: 4,827,635
[45] Date of Patent: May 9, 1989

[54] BIVALVE MOLLUSK DREDGE

[76] Inventor: Peter Erlandsen, 122 E. Myrtle Rd., North Wildwood, N.J. 08260

[21] Appl. No.: 223,163

[22] Filed: Jul. 22, 1988

[51] Int. Cl.$^4$ .......................... A01K 75/00; E02F 5/00
[52] U.S. Cl. ........................................................ 37/55
[58] Field of Search ....................... 37/DIG. 8, 119, 55

[56] References Cited

U.S. PATENT DOCUMENTS

| | | | |
|---|---|---|---|
| 381,835 | 4/1888 | Gursuch. | |
| 494,614 | 4/1893 | Wyman. | |
| 1,323,122 | 11/1919 | Taylor | 37/55 |
| 1,792,592 | 2/1931 | Lewis | 37/55 |
| 2,307,436 | 1/1943 | Wadelton et al. | 55/104 |
| 2,417,121 | 3/1947 | Nelson | 37/55 |
| 2,648,918 | 8/1953 | Mazzella | 37/55 |
| 3,113,389 | 12/1963 | Vuskovich | 37/55 X |
| 3,120,714 | 2/1964 | Goodwin | 37/55 X |
| 3,226,854 | 1/1966 | Mero | 37/58 |
| 3,365,823 | 1/1968 | Vogt | 37/71 |
| 3,608,217 | 9/1971 | Voisin, Sr. | 37/55 |
| 4,112,602 | 9/1978 | Kato et al. | 37/55 |
| 4,425,723 | 1/1984 | Erlandsen | 37/55 |

Primary Examiner—Clifford D. Crowder
Attorney, Agent, or Firm—Thomas A. Lennox

[57] ABSTRACT

A bivalve mollusk collecting device resting on two runners with guides to allow upward movement of the collection device with springs to maintain a downward pressure on the collection device as it is dragged through the sand to collect the mollusks. The device has a plurality of acutely angled teeth positioned in a "V" shape pointed rearwardly to form a trough shape with spaces between the teeth sufficient to allow the sand and small sized mollusks to escape to the side and below the trough. Object jumper members extend forwardly at a 45 degree angle below and in front of the teeth to cause the entire collection apparatus to ride over immoveable objects. A grading device rearwardly of the collection apparatus includes horizontal rods again spaced to allow sand and smaller mollusks to escape to the side and below the grading apparatus. An accumulating cage is positioned to the rear of the skid to accumulate the mollusks that are collected.

31 Claims, 7 Drawing Sheets

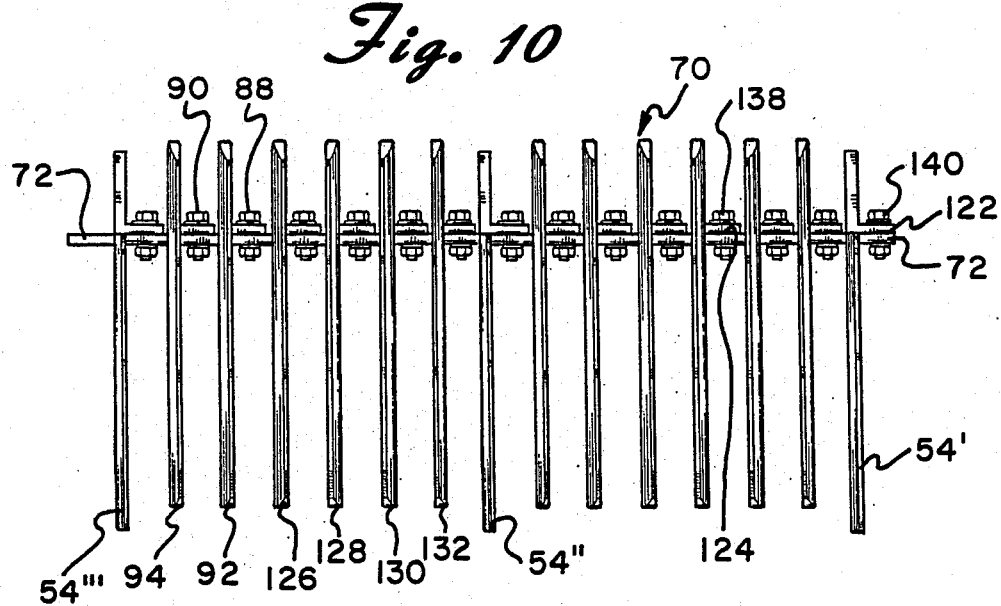
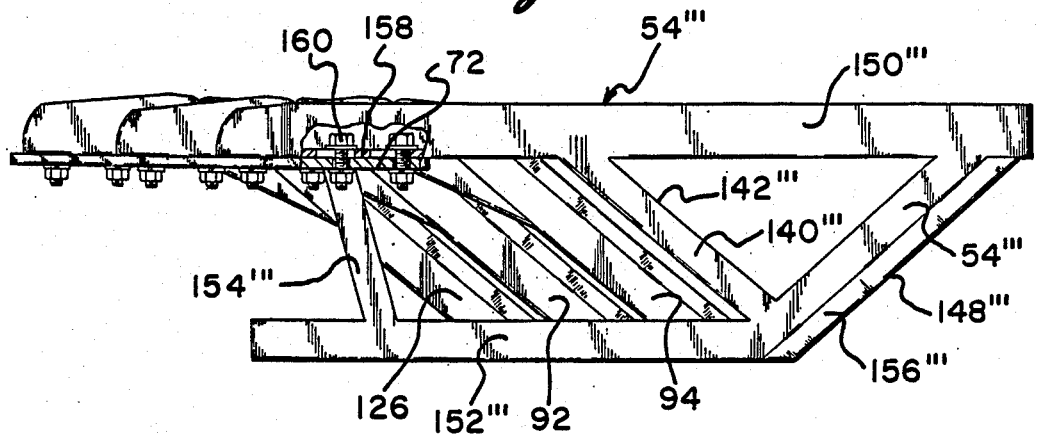
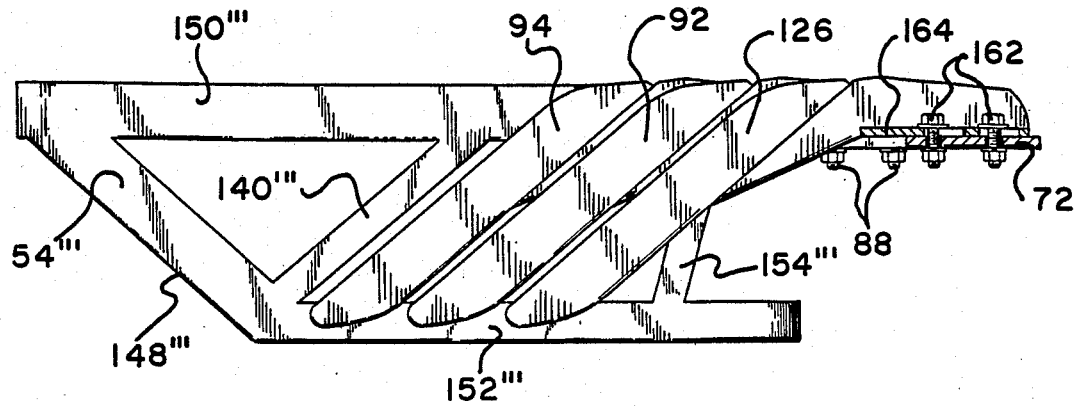

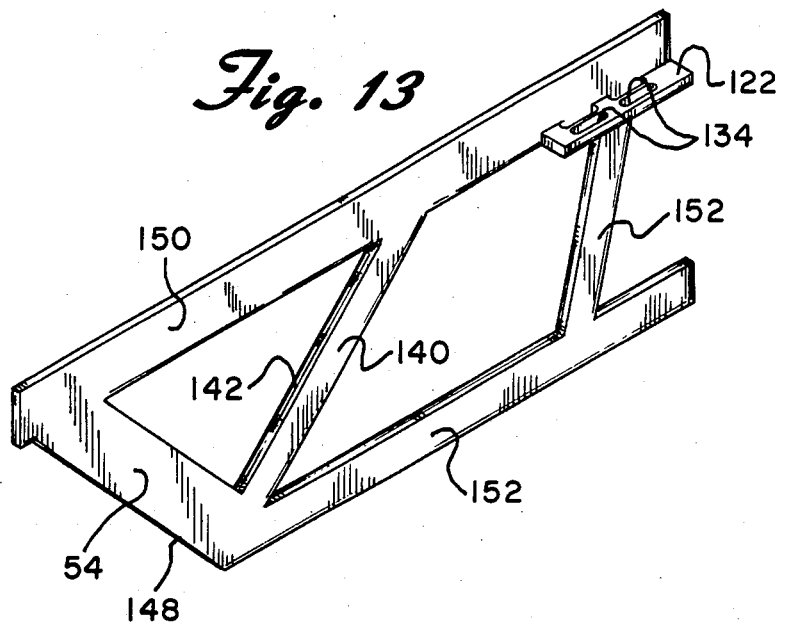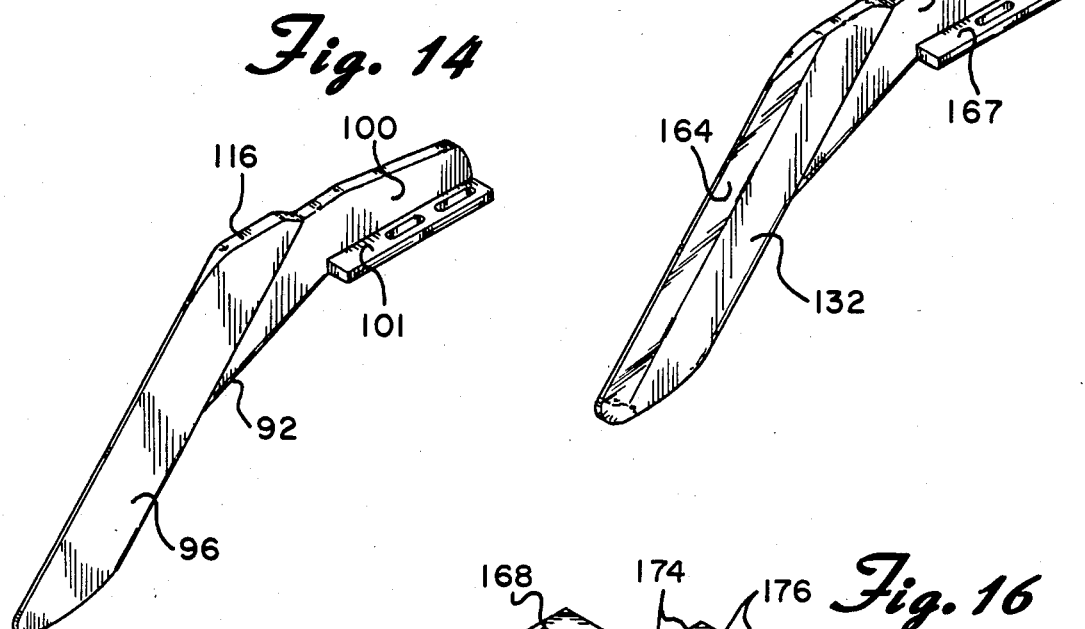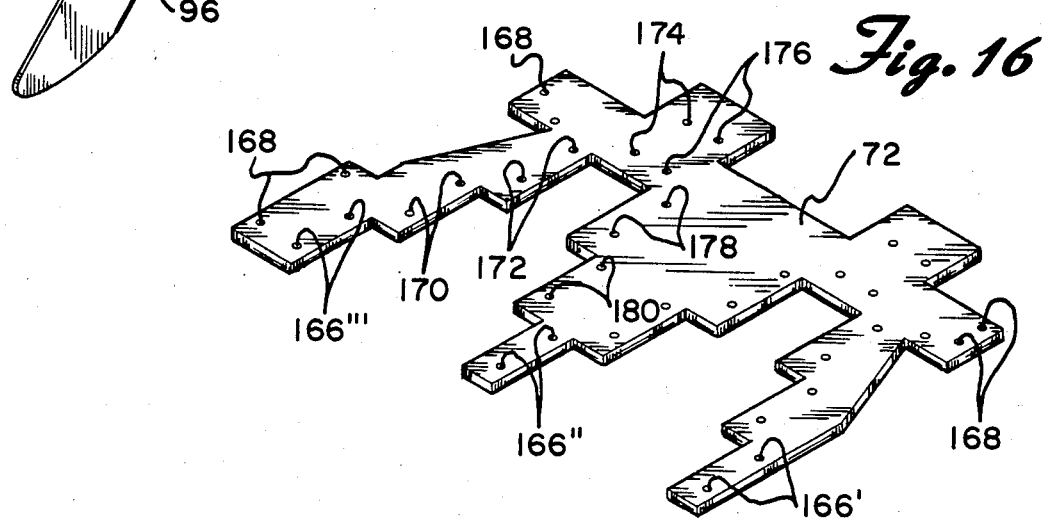

BIVALVE MOLLUSK DREDGE

BACKGROUND OF THE INVENTION

This invention involves a shellfish dredge and more particularly a bivalve mollusk harvesting apparatus used on a dredge.

In my U.S. Pat. No. 4,425,723 which issued Jan. 17, 1984, a dredge for harvesting clams, quahogs, and the like, is described with at least two cross bars connecting the skids together. Tines are attached to the cross bars angled downwardly forming at least two parallel rows. One of the apparatuses described in my patent utilizes reduced spaces between the tines from the front to the back of the apparatus. While this apparatus certainly works satisfactorily, it has been determined that certain configurations under my patent do not harvest the clams in the most efficient fashion. A tendency has been observed that there is a high drag in pulling the device and there is not a sufficiently efficient flow of material through the apparatus. In my prior apparatus, the sand from the bottom is picked up with the mollusks and there is a flow of almost liquid character up the tines and to the rear of the sled. That flow is a solid mass of mollusks and sand, with mostly sand being picked up at the front of the sled. On the sides of the sled, it is necessary to affix screens that prevent the mollusks from falling off the side of the sled once picked up. The flow described above tends at higher speeds of drag not to dissipate the sand before it reaches the rear of the skid. Further the prior device does not sufficiently sort the mollusks as to size. U.S. Pat. No. 3,226,854 to Mero describes a dredge underwater pick up head assembly which utilizes a vacuum pipe line to pick up small sized objects, a "U" shaped head assembly with the entire center section of tines positioned flat toward the movement direction is utilized with a screen to prevent large object from entering into the vacuum pipe line. This configuration is opposite to the performance required for the effective collection of the larger mollusks. This type of suction apparatus typically destroys a major portion of the clams and fills them with sand which in part is never removable. This type of apparatus does not satisfy the needs above nor attain the objects described hereinbelow.

SUMMARY OF THE INVENTION

It is an object of the present invention to provide an apparatus for the collection of bivalve mollusks from the ocean floor which will have the least tendency to break or injure the mollusks in the collecting procedure.

It is a particular object of the present invention to provide an apparatus for the collection of shellfish which does away with costly hoses, pumps, manifolds and the balance of the equipment necessary to pump sand and water through a collection apparatus.

It is a further object of the present invention to provide an apparatus for the collection of clams that sorts the clams taking only the full size clams and leaving the undersized clams behind for further growth.

It is an additional object of the present invention to provide a clam collection apparatus which does not destroy the clam beds in the process of collection.

It is a particular object of the present invention that the apparatus for collection of the clams does not pump sand into the clam body making it essentially impossible to remove the sand during the cleaning process.

It is a specific object of the present invention to provide an apparatus for the collection of clams which tends to keep the clams alive longer, such that they are usually alive when they reach port.

It is particular object of the present invention to provide an apparatus for the collection of shellfish which is adjustable to harvest varying sized shellfish adjusting for the size of the adult fully grown shellfish while leaving the undersized shellfish of choice behind.

It is a specific object of the present invention to provide an apparatus for the collection of shellfish wherein the various parts of the collection apparatus may be easily replaced wherein each individual part is detachably attached to the apparatus.

It is a specific object of the present invention to provide an apparatus for the collection of shellfish which utilizes teeth that cut through the sand easier utilizing a first set of teeth to dig through the sand with rear teeth slicing the sand behind the previous tooth.

It is a particular object of the present invention to provide a collection apparatus for shellfish utilizing teeth knifing through the sand which allows the sand to flow through the teeth easier and prevent sand build up to clog the collection apparatus.

It is a further object of the present invention to provide a collection apparatus that facilitates the flow of sand through the collection device leaving the proper size mollusks behind while allowing the sand, the smaller debris, and under sized mollusks behind.

It is a particular object of the present invention to provide a collection device which directs the flow of the while directing the flow of the sand and smaller mollusks to the side and out of the apparatus as it is pulled along the ocean floor bottom.

It is a specific object of the present invention to provide an apparatus wherein the flow of the sand and mollusks through the collection devices are segregated providing for sideways flow of sand and undersized mollusks such that the mass of mollusks reach the collection cage adjacent the rear of the sled essentially without sand, the sand having been dissipated to the sides of the collection devices and through a grading screen prior to reaching the rear of the sledge.

It is a particular object of the present invention to provide a plurality of teeth that efficiently cut through the sand with minimal drag, the spacing between the teeth being adjustable to compensate for varying sized clams.

It is a specific object of the present invention to provide a clam collection apparatus which tends to place a minimal amount of sand in the clams during the harvesting process.

It is a particular object of the present invention to provide an essentially free flow of sand and mollusks through the collection devices with a minimum of cross members to interfere with the sand flow to the side and below the collection apparatus and of the mollusks upwardly to an accumulation device.

It is a specific object of the present invention to provide a bivalve mollusk collection device that provides less drag and is easier to pull along the ocean floor.

It is a particular object of the present invention to provide a mollusk collection device which provides an effective sorting of the mollusks as to a satisfactory size to keep while allowing the undersized mollusks to pass to the sides and below the collection device.

The invention is an apparatus for collecting shellfish, such as bivalve mollusks or even crabs from the ocean floor on a skid comprising a front, a rear, two opposite sides, and a pair of elongated runners positioned longitudinally along the opposite sides, and a mollusk accumulation cage means attached adjacent the rear of the skid opening forwardly to accumulate the mollusks. The apparatus includes at least one collection device on the skid, each device including a horizontal support member positioned laterally between the sides. The collection device further includes a plurality of teeth attached and depending from the horizontal member, each tooth having a lower end and an upper section, the teeth being angled downwardly and forwardly at an acute angle with respect to the runners. The teeth are positioned apart laterally across the device with each inner tooth being disposed rearwardly from its adjacent tooth to the outside, such that the horizontal position of the front ends of the teeth form a "V" shape and the spacing between the teeth and the set back spacing to the rear is sufficient to allow smaller sized mollusks to pass between the teeth to the side and rear of each collection device. The apparatus further includes a resistible spring means attached between the collection device and the skid to exert a downward force to the device. Finally, the apparatus further includes a grading device comprising a plurality of generally horizontal rod members, the length of the rod members positioned front to rear and disposed laterally in parallel relationship to each other, with front ends terminating at the upper sections of the teeth and rear ends terminating adjacent the accumulating cage means, wherein the spacing between the rod members is sufficient to allow smaller sized mollusks to drop down between the rods.

It is preferred that the acute angle of the teeth with the runners be in the range of 35 to 45 degrees, and that a leading edge of each angled tooth be beveled to direct the flow of sand toward the sides from each collection device. It is preferred that there be six teeth in each collection device with two center teeth positioned side by side rearwardly. It is further preferred that the collection device further include at least one object jumping device including a structural member attached to and depending from the horizontal support member and a leading edge of a member attached to the structural member, with the leading edge being angled upwardly to the front and being positioned in front of and below the most frontwardly positioned tooth. It is further preferred that the object jumping device further include a structural member with a second leading edge angled parallel to and positioned to a side and forwardly of an adjacent tooth a similar distance as that between adjacent teeth. It is further preferred that the apparatus include at least two collection devices separated by an object jumping device and with an object jumping device positioned on each side, all attached to a single horizontal support member. It is further preferred that the attachment of the teeth and the object jumping device to the horizontal support member be detachable and adjustable front to rear. It is further preferred that the shortest horizontal distance between the teeth be about two inches. It is further preferred that the apparatus further include a frame including a pair of longitudinal horizontal members positioned front to rear on the skid and resting on the skid with the horizontal support member structurally attached between the longitudinal members, and guide means attached to the skid that allows the frame to lift upwardly but prevents significant movement in other directions. It is further preferred that the horizontal rod members of the grading device are positioned at varying heights in a pattern of every other rod member being at a lower height than the adjacent rod members. It is further preferred that the horizontal rod members of the grading device be angled upwardly to the rear, and the horizontal rod members of the grading device be attached to the apparatus and merely abut against the top section of teeth. It is further preferred that the teeth be generally of an "L" shape with an abuts angle between the legs with the long leg beveled and sharpened to a leading edge and depending downwardly and forwardly to a lower end and the short leg positioned horizontally and having an upper horizontal surface abutting the forward end of the grading device rod members.

The invention is an apparatus for collecting bivalve mollusks, particularly clams, such as clams, also known as skimmers, bay clams, quahogs and the like, from the ocean floor including a skid which includes a front, a rear, two opposite sides, and a pair of elongated runners positioned longitudinally along the opposite sides. An accumulator cage device is attached adjacent the rearward position of the skid opening forwardly. The apparatus further includes a collection device, preferably at least two in number, on the skid, each device including a horizontal support member positioned laterally between the sides. The invention further includes a resistible spring means attached between the device and the skid to exert a downward force on the device. Each device includes a plurality of tines, each having a lower, generally pointed, end and an upper end. The tines are angled downwardly and forwardly at an acute angle with respect to the runners and are positioned apart laterally across the device with each inner tine being disposed rearwardly from its adjacent tine to the outside. The rearward disposition of each inner tine is such that the horizontal position of the lower ends of the tines form a "V" shape. The spacing between the tines and the set back spacing to the rear is sufficient to allow the sand and smaller sized mollusks to pass between the tines to the side and rear of each collection device. The apparatus further includes a grading device comprising plurality of generally horizontal rod members angled upwardly and rearwardly. The length of the rod members are positioned front to rear disposed laterally in parallel relationship to each other, with front ends abutting the upper ends of the tines and rear ends terminating adjacent the accumulator cage means. The spacing between the rod members is sufficient to allow smaller sized mollusks to drop through between the rods.

The invention is an apparatus for collecting bivalve mollusks from the ocean floor on skid comprising a front, a rear, two opposite sides, and a pair of elongated runners positioned longitudinally along the opposite sides, and a mollusk accumulation cage means attached adjacent the rear of the skid opening forwardly to accumulate the mollusks. The apparatus include a frame including a pair of longitudinal members positioned front to rear on the skid and resting on the skid and guide means attached to the skid that allows the frame to lift upwardly but prevents significant movement in other directions. The apparatus includes at least one collection device on the skid, each device including a horizontal support member attached to the frame laterally between the sides and a plurality of teeth attached and depending from the horizontal member, each tooth having a lower end and an upper section, the teeth being angled downwardly and forwardly at an acute angle with respect to the runners, the teeth being positioned apart laterally across the device with each inner tooth being disposed rearwardly from its adjacent tooth to the outside. The horizontal position of the front ends of the teeth form a "V" shape and the spacing between the teeth and the set back spacing to the rear is sufficient to allow smaller sized mollusks to pass between the teeth to the side and rear of each collection device. Each collection device also includes at least one object jumping device comprising a structural member attached to and depending from the horizontal support member and a leading edge of a member attached to the structural member, with the leading edge being angled upwardly to the front and being positioned in front of and below the most forwardly positioned tooth. The apparatus also include a resistible spring means attached between the frame and the skid to exert a downward force to the frame, and a grading device include a plurality of generally horizontal rod members, the length of the rod members positioned front to rear and disposed laterally in parallel relationship to each other, with front ends terminate at the upper section of the teeth rear ends terminating adjacent the accumulation cage means, wherein the spacing between the rod members is sufficient to allow smaller sized mollusks to drop down between the rods.

BRIEF DESCRIPTION OF THE DRAWINGS

FIG. 10 is a partial frontal view taken along lines 10—10 of FIG. 9.

FIG. 11 is a partial cut-away side elevational view taken along lines 11—11 of FIG. 9.

FIG. 12 is a cross-sectional view taken along lines 12—12 of FIG. 9.

FIG. 13 is a perspective view of an object jumper device that is part of the collection device illustrated in FIG. 8.

FIG. 14 is a perspective view of a single tooth beveled to the left that is part of the collection device illustrated in FIG. 8.

FIG. 15 is a perspective view of a single tooth beveled to the right that is part of the collection device illustrated in FIG. 8.

FIG. 16 is a perspective view of the horizontal support member on which the teeth and object jumping devices are attached for the devices illustrated in FIG. 8.

DESCRIPTION OF PREFERRED EMBODIMENTS

Figure 1:
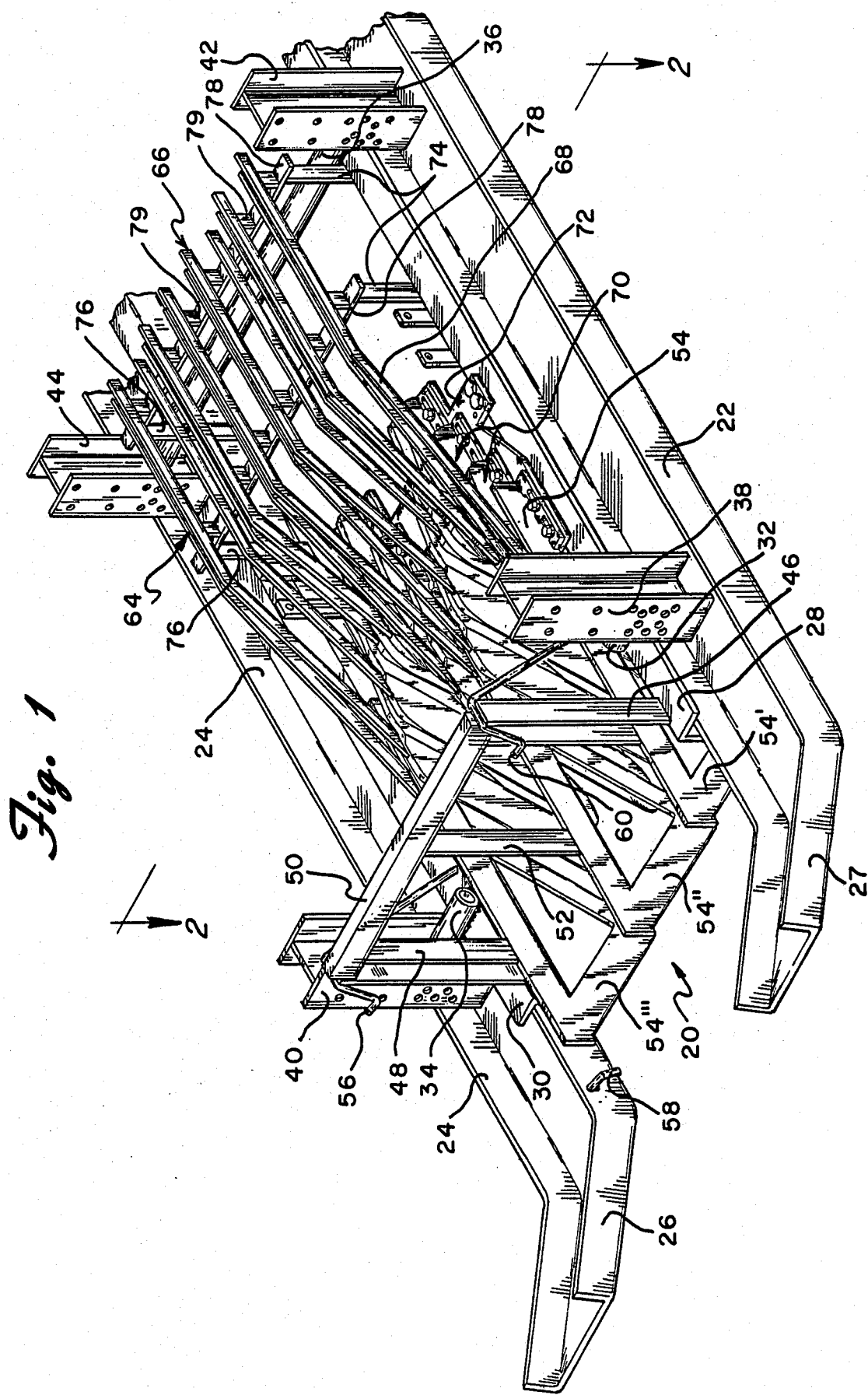
FIG. 1 is a perspective view of an apparatus for collecting bivalve mollusks of the present invention installed on a skid to be dragged along the ocean floor.
Figure 2:
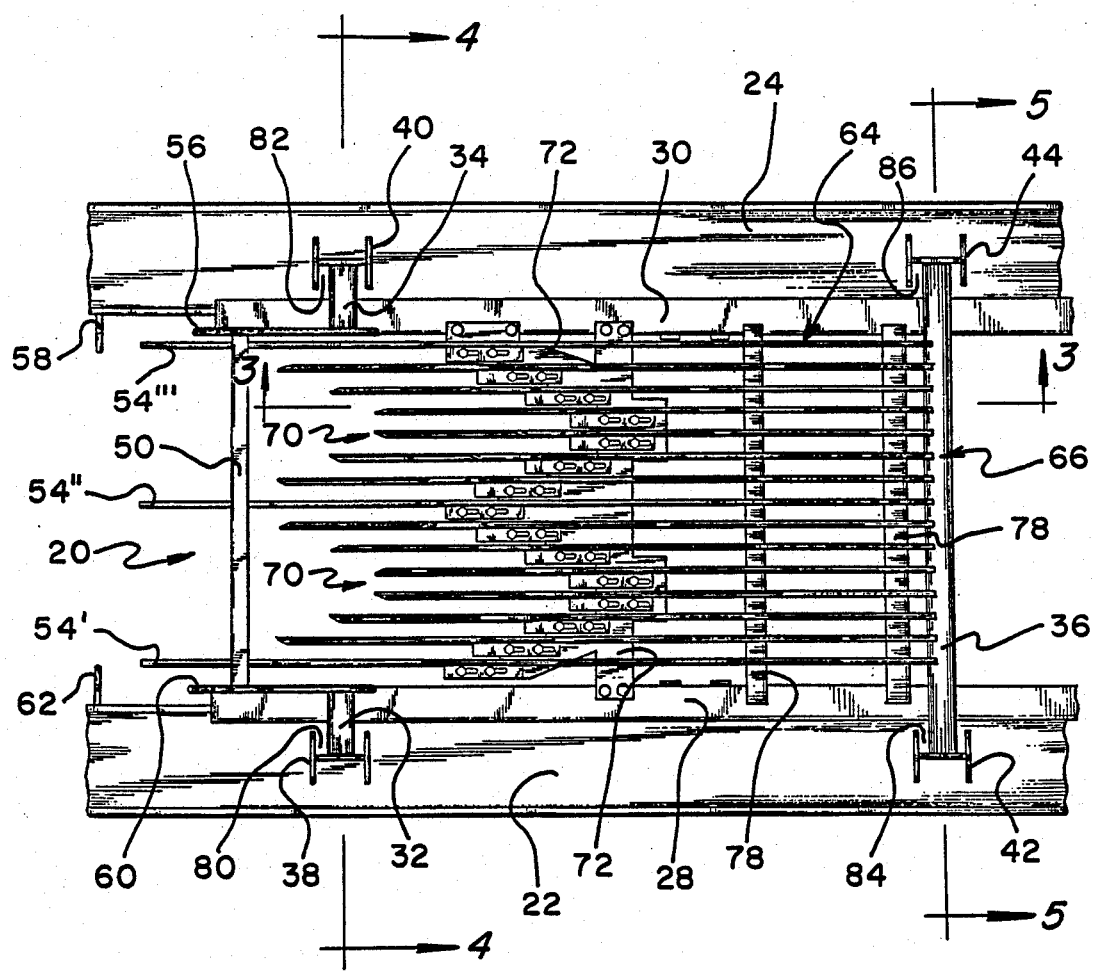
FIG. 2 is a partial cut-away top view of the apparatus of FIG. 1.

In FIG. 1, apparatus 20 for collecting bivalve mollusks from the ocean floor is shown interfitted on a skid represented by runners 22 and 24 which terminate at their front ends in upturned sections 26 and 27 to facilitate skidding along the ocean floor. Cross members and vertical members to complete the structure of the skid as well as the mollusk accumulation cage, which is essentially a five-sided cage open toward the front of 3/16 inch wire welded together and positioned adjacent the rear of the sled are not illustrated to clarify the drawings. The skid and accumulating cage are standard devices in the prior art and for the purposes of this disclosure may be considered similar to that illustrated in U.S. Pat. No. 4,425,723, incorporated herein by reference. Apparatus 20 includes longitudinal rail members 28 and 30 supported and held in position by cross members in the form of a frame hidden in this view. It should be understood that there can be any convenient number of collecting apparatuses 20 positioned on a sled. Larger sleds may be utilized to support tow apparatuses 20, which each include two separate collecting devices to be described hereinbelow. Larger sleds may house as many as six, or even more, collecting devices and they may be utilized in pairs as illustrated in apparatus 20 or may be installed singularly on closer based rail members such as 28 and 30. Horizontal cantilever guide members 32 and 34 are welded to the top of rail members 28 and 30 extending outwardly toward the sides of the skid and extending over runners 22 and 24. Vertical "I" beam guide channels 38 and 40 are welded to the top of runners 22 and 24 positioned such that guide members 32 and 34 can ride upwardly in the vertical channel. Likewise, horizontal rod guide member 36 extending and welded to the top of rail members 28 and 30 extends out beyond the side-wise edges over runners 22 and 24. These extensions beyond members 28 and 30 ride in vertical channels of guide "I" beam channels 42 and 44 which are both welded to the top of runners 22 and 24. This mechanism allows apparatus 20 to ride upwardly, but essentially prevents movement in any other direction. Teeth 70 are detachably and adjustably attached to horizontal support member 72. Object jumper members 54 are also detachably and adjustably attached to member 72. Vertical support members 74 and 76 are welded at the bottom to rail members 28 and 30 which are welded at the top to support horizontal support members 78 on which horizontal rods 66 are welded extending front to rear with the frontal portions 68 angled downwardly to allow the front ends of each rod 66 to rest on but not be attached to the top surface of teeth 70 and object jumpers 54. Vertical brace members 46 and 48 are welded to rail members 28 and 30 and are in turn welded at the tops to horizontal brace member 50 from which depends welded vertical brace 52. The bottom of each vertical brace members 46, 48 and 52 is welded to the tops of object jumpers 54 to provide added strength and resistance should the object jumpers contact an object of major size and to prevent them from deforming. Hooks 56 and 60 are welded at the top of brace member 46 and 48. Hooks 58 and 60 (the latter hidden in this view) are welded to runners 24 and 22 respectively. An elastic rubber "snugger" used to hold boats at their moorings, or a coil spring is attached to the upper and lower hooks. Thus, a spring is attached to hooks 56 and 58, not shown in this view to avoid confusion, to hold apparatus 20 in a downward position but yet allow it to raise up in channels 38, 40, 42 and 44 should any of the object jumpers 54 strike an object thus lifting teeth 70 upwardly to avoid catching on the object and stopping the sled. The top view of FIG. 2 partially cut away to the front and the rear, illustrates the overall configuration of apparatus 20 including sorting apparatus 64 positioned on and resting on runners 22 and 24. Guide members 32, 34 and 36 (both ends) ride upwardly in channels 80, 82, 84 and 86 of "I" beams 38, 40, 42 and 44, respectively. Hook 62 is positioned to connect with a spring between it and hook 60.

Figure 3:
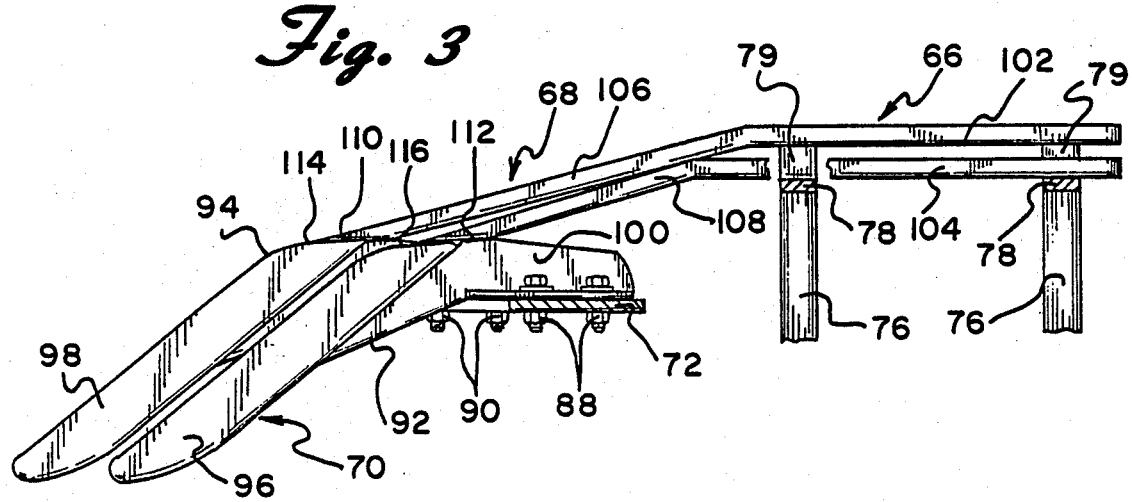
FIG. 3 is a vertical cross-sectional view taken along lines 3—3 of FIG. 2.
Figure 4:
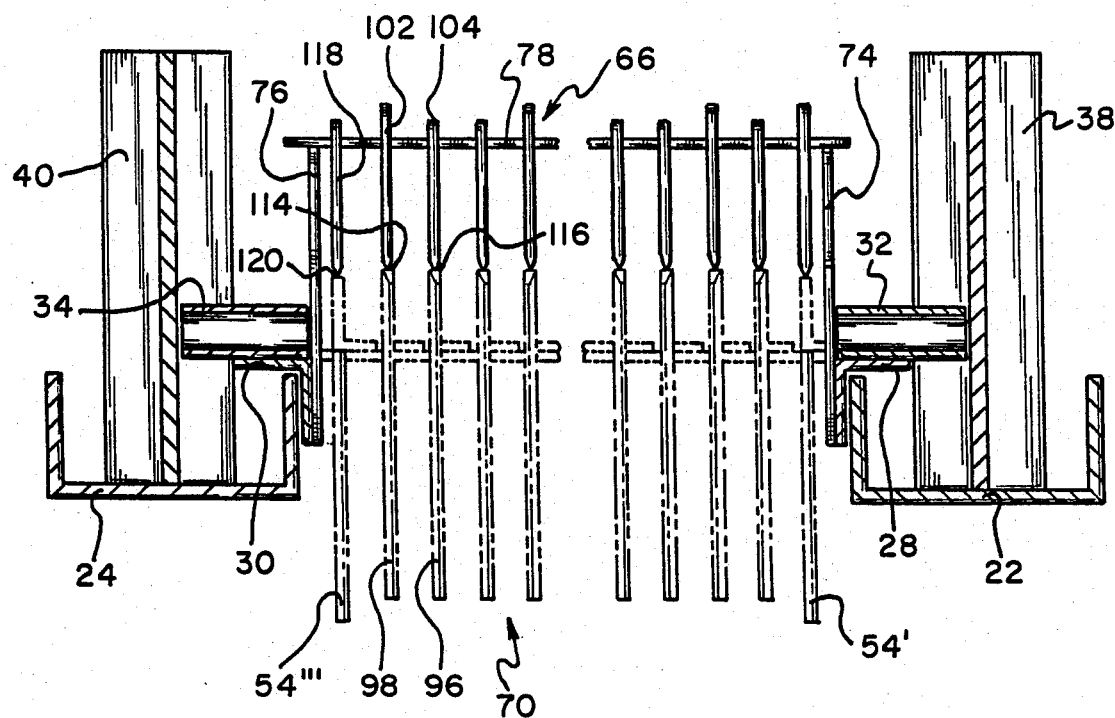
FIG. 4 is a vertical cross-sectional view taken along lines 4—4 of FIG. 2.
Figure 5:
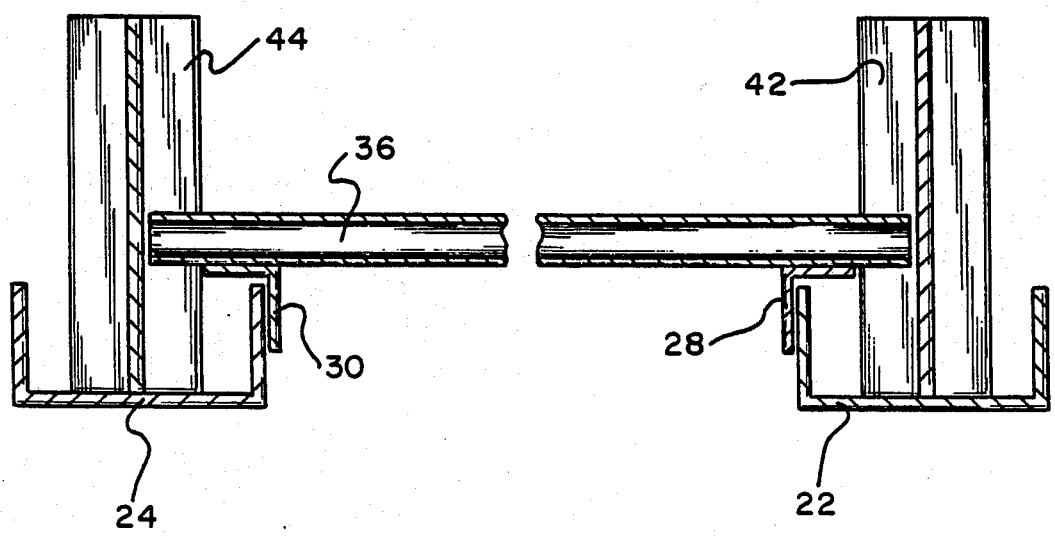
FIG. 5 is a vertical cross-sectional view taken along lines 5—5 of FIG. 2.

In FIG. 3, a close up view of horizontal rods 66 of grading device 64 and teeth 70 of the collection device is illustrated. Tooth 92 is attached to horizontal support member 72 by bolt and nut combinations 88. Tooth 94 is attached to support member 72 by bolt and nut combinations 90. Since both teeth 92 and 94 are on the outside of the collection device, they are beveled on the side opposite this view tending to direct sand and small size mollusks to the outside and away from the collection device. All of teeth 70, including teeth 92 and 94 illustrated here, are generally of "L" shape with an obtuse angle between the two legs. The longer lower depending legs 96 and 98 of teeth 92 and 94, respectively, extend downwardly and are angled at about 38 to 40 degrees from the horizontal. Since the upper legs of teeth 70, such as leg 100 of tooth 92 are generally horizontal, the obtuse angle between these legs is about 128 to 130 degrees. Horizontal rods 66 which comprise the bulk of grading apparatus 64, are supported on vertical support members 76 which in turn are welded to and support horizontal support members 78. Vertical spacers 79 are welded to horizontal support members 78 to support upper horizontal rods such as horizontal rod 102 illustrated here. Lower horizontal rods 66, such as horizontal rod 104 illustrated here, rest directly on horizontal support members 78. As horizontal grading rods 102 extend forwardly, they are angled downwardly in forward sections 68 such as forward sections 106 and 108 of rods 102 and 104, respectively. Horizontal rods 102 and 104 terminate at front ends 110 and 112 respectively resting on, but not attached to top surfaces 114 and 116 of teeth 94 and 92 respectively. In the frontal cross-sectional view, of FIG. 4, the relative depth of teeth 70 with object jumpers 54 is illustrated, each tooth being about one inch less in depth than object jumpers 54. Also, rod 118 rests on top 120 of object jumper 54. It is a relatively simple matter to detachably attach horizontal support members 78 to vertical support members 76 and 74 allowing the entire grading device 64 to be removed. The actual distance between grading rods 66 is about two inches although the horizontal distance between them is slightly smaller. The maximum angled distance is the important distance with respective to the size of the mollusks, allowing the smaller mollusks to drop downwardly with the sand. The offset of the grading rods, up and down across the lateral direction between the skids also facilitates the flow of sand and smaller mollusks downwardly and out of apparatus 20. In FIG. 5, the rear guide channels of "I" beams 42 and 44 are illustrated within which guide member 36 rides upwardly carrying rail members 28 and 30 and the entire apparatus 20 upwardly against spring resistance means connected to runners 22 and 24.

Figure 6:
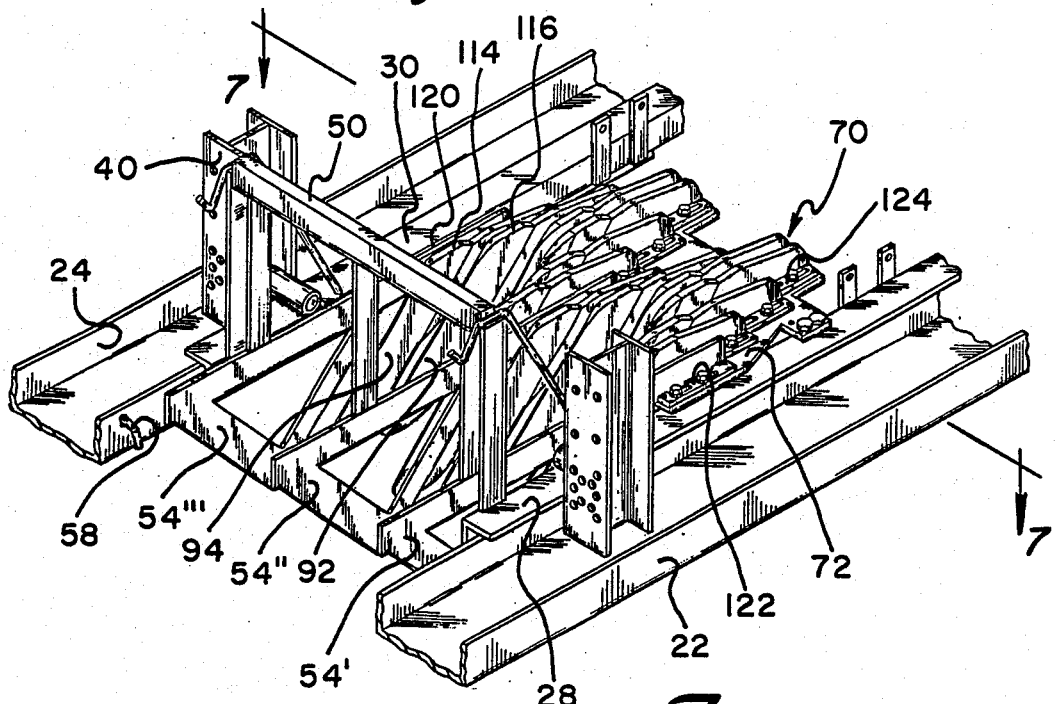
FIG. 6 is a partial cut-away perspective view illustrating the grading device removed from the apparatus illustrated in FIG. 1.
Figure 7:
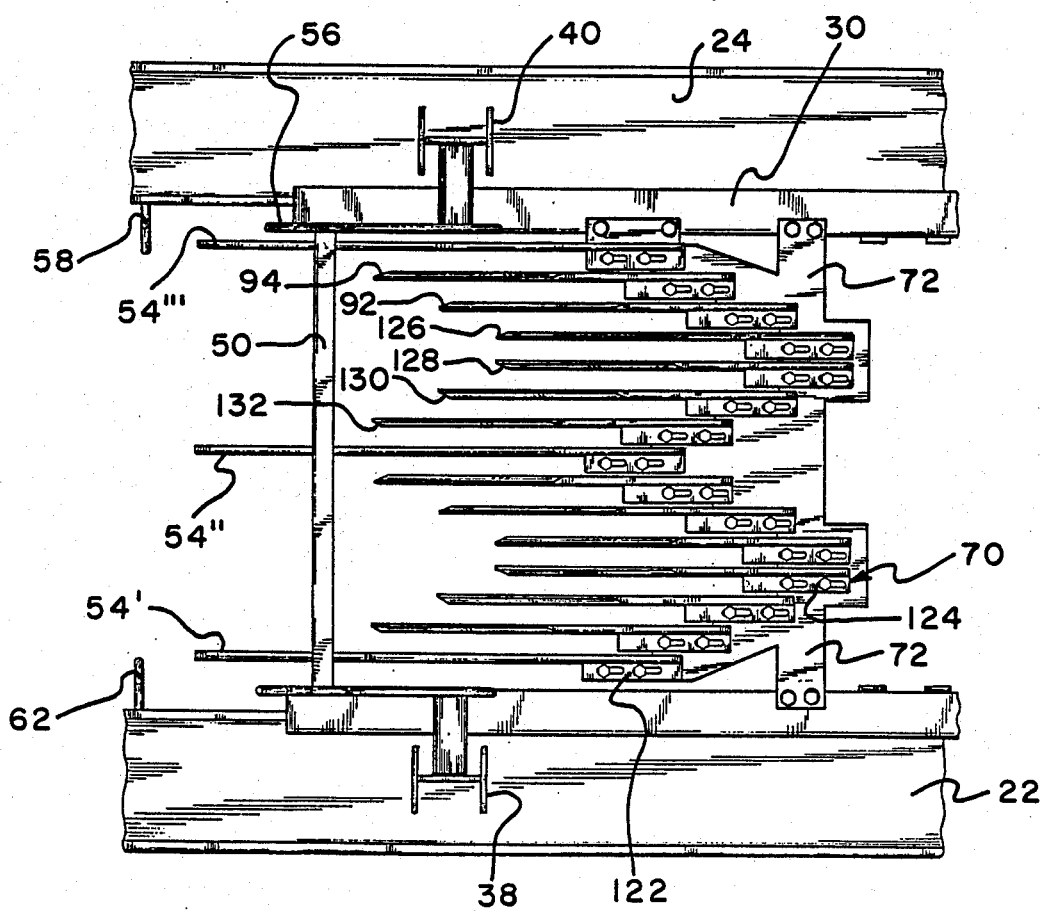
FIG. 7 is a top view taken along lines 7—7 of FIG. 6.
Figure 8:
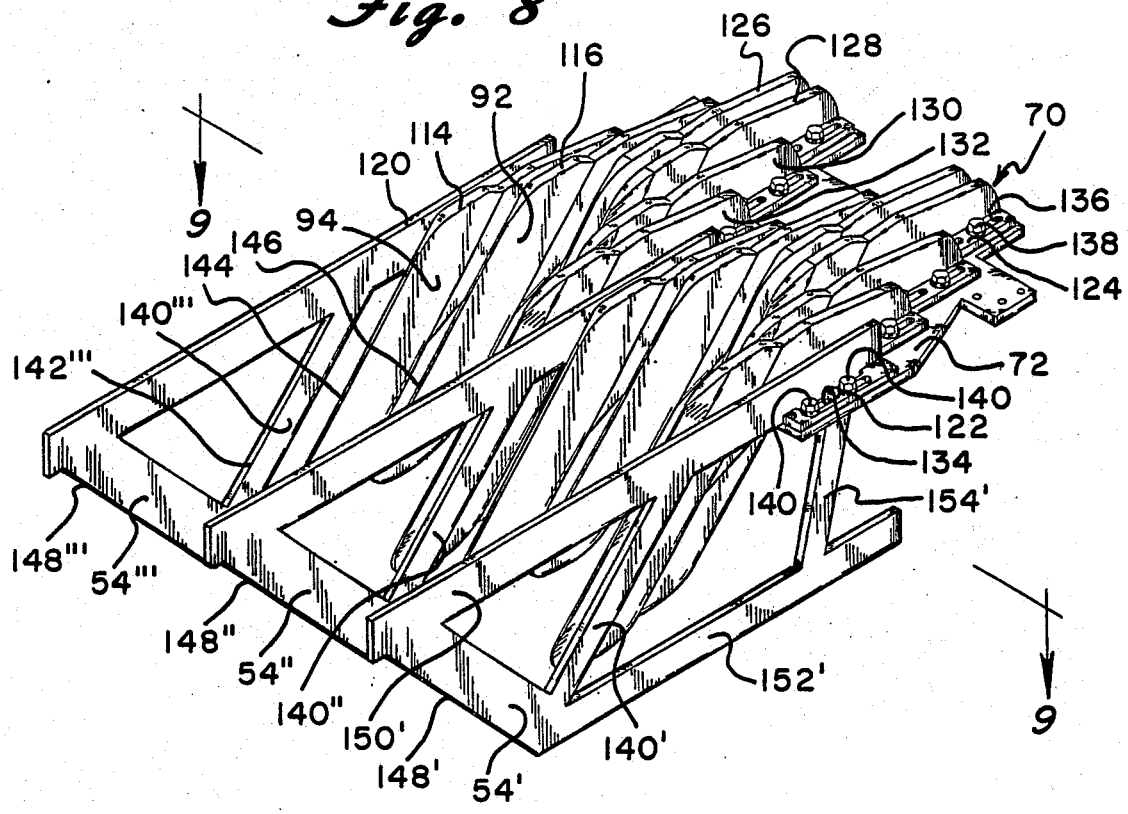
FIG. 8 is a partial cut-away perspective view illustrating the collection devices of the present invention illustrated in FIG. 1.

FIG. 6, with the rear of runners 22 and 24 cut off to effectively remove grading device 74, allows the collection devices to be more clearly viewed. Top surfaces 114 and 116 of teeth 94 and 92 are visible in this view as is top surface 120 of object jumper 54, on which rods 66 rest during operation. Each tooth 70 and each object jumper 54 is attached through a horizontal plate welded to the side of a rear portion of each tooth or object jumper. Horizontal plate 122 is attached through bolts extending through longitudinally lengthened holes to horizontal support member 72. Likewise, horizontal plate 124 of a tooth 70 has longitudinally lengthened holes through which bolt and nut combinations attach the tooth to horizontal support 72. The top view of FIG. 7 more clearly shows the attachment of a tooth 70 through horizontal plate 124 to horizontal support member 72. The relative spacing front to rear of teeth 70 is now clearer in this view wherein teeth 92, 94, 126, 128, 130 and 132, together with at least one object jumper 54, either 54" or 54''' constitutes a collection device. Teeth 94 and 132 are the most forward teeth followed by the next rearward teeth 92 and 130, with teeth 126 and 128 in the center and the most rearward position. The overall shape of the teeth configuration from this view is a "V" shape. The left most teeth, looking from the front, are teeth 94, 92 and 126 all beveled to the left to direct sand and small mollusks to the left and downwardly through the collection device. The right most teeth, 128, 130 and 132 are all beveled to the right directing the flow of sand and small mollusks to the right and out of the collection device. The maximum distance between the leading edges of these teeth is about two inches. This requires a horizontal distance between the teeth of about an inch and a half to an inch and three quarters. Each of these teeth are attached through elongated holes through horizontal plates extending from the rear lower edge of each tooth to horizontal support member 72. For example, horizontal plate 124 from typical tooth 70 abuts the top surface of horizontal support member 72 and attached through holes 136 by bolt and nut combinations 138. Likewise, object jumper 54' is attached through horizontal plate 122 welded adjacent the rear of jumper 54 with elongated holes 134 opened to receive bolt and nut combinations 140 to attach horizontal support member 72. In FIG. 8, the configuration of collection devices are shown generally in the form of trough formed by a leading edges of the teeth as well an angled support members 140 of object jumpers 54. For example, angle support 140''' of object jumper 54''' is positioned ahead of tooth 94 such that leading edge 142' is positioned ahead of leading edge 144 of tooth 94. Thus, the angled support members, such as angle support 140''' act as a guide to direct the full size clams upwardly and to the rear through the "chute" arrangement of teeth 70. The full size clams are propelled upwardly along the leading edges of the teeth to the rear, up onto horizontal rods 66 where they are further guided toward the rear to a net accumulation device to accumulate full size clams proximate the rear of sled. As further illustrated in FIG. 8, angled cross member 140''' is angled at about 40 degrees roughly equivalent to that of tooth 94 and further positioning leading edge 142' of cross member 140''' spaced away from leading edge 144 of tooth 94 in the same relationship and spacing as that between adjoining teeth. For example, the spacing between leading edges 142 and 144 is essentially identical to that between leading edge 144 and leading edge 146 of tooth 92. This provides for spacing, grading and flow of materials between all of the angled elements in the same fashion. Also illustrated in this view are upper edges 114 and 116 of teeth 94 and 92 respectively positioned next to upper edge 120 of object jumper 54'''. The balance of the teeth in that collection unit including six teeth and an object jumper is shown is this perspective view. Each collecting unit includes six teeth and one object jumper, which may be positioned on either side of the six tooth combination. Apparatus 20 includes any number of collection units from one to ten and is preferably composed of units of two collection units totaling twelve teeth and three object jumper devices. Leading edges 148 of object jumper 54 are angled at about a 45 degree angle upwardly and frontwardly causing it to be pushed upwardly when it meets a solid object. For example, leading edge 148' of object jumper 54' is a beveled edge to cut through the sand efficiently at a 45 degree angle. Each object jumper includes not only the leading edge but upper horizontal support member 150' attached to horizontal connection plate 122 with lower horizontal guide member 152' and rear vertical support member 154. The overall configuration of each object jumper 54 is much like a sled runner cutting through the sand and being the first contact point to any object.

Figure 9:
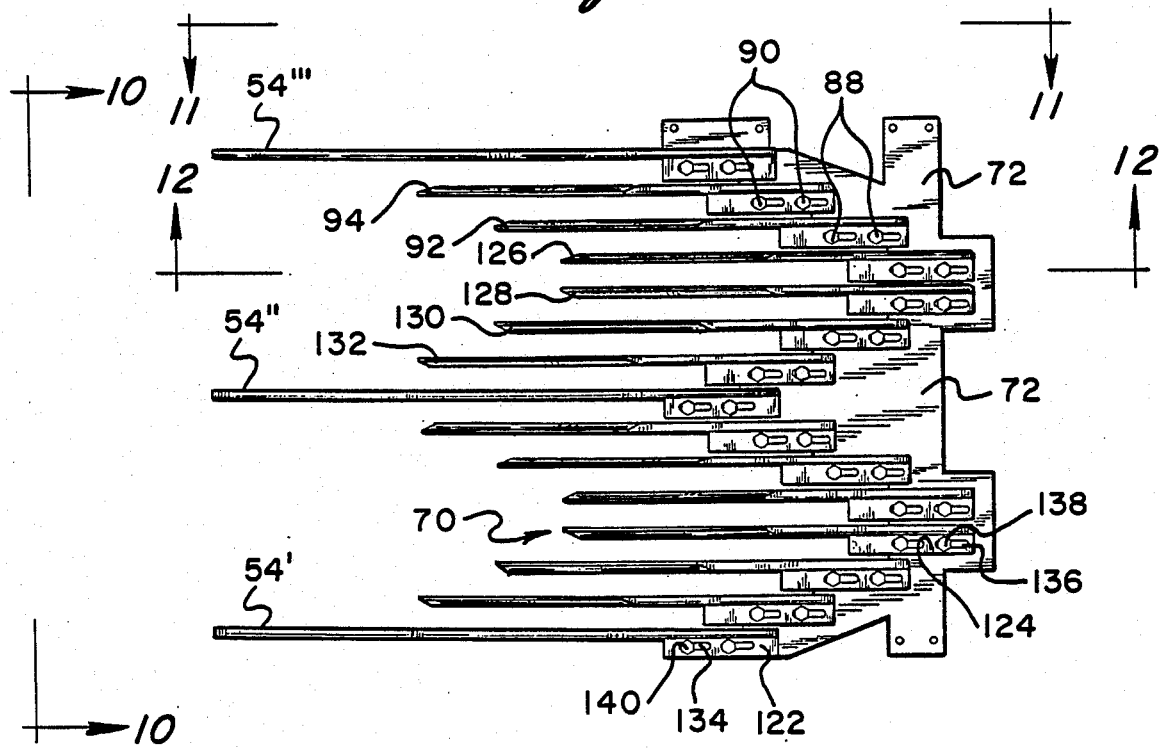
FIG. 9 is a top view taken along lines 9—9 of FIG. 8.

The upper view of FIG. 9 shows the various positioning of each tooth configuration. The set back of each tooth is sufficient to place about a two inch distance between the teeth to the rear and side, that distance being the minimal distance at any point. This assures that the larger clams will be retained and pushed up the trough to be collected.

In FIG. 10, the frontal view shows the vertical positioning of the teeth and object of teeth 70 and object jumpers 54. Teeth 70 are cutting to an approximate equal depth with each object jumper cutting at a depth about one inch below the level of the teeth. The trough effect is obtained by the angle of teeth and the set back of the teeth to the center of each collecting unit.

In FIG. 11, the various parts of object jumper 54''' are illustrated showing the set back of the leading edge of each tooth from leading edge 142''' of angled cross member 140'''. Object jumper 54 is attached through horizontal plate 158 with bolts and nuts combination 160 to horizontal support member 72. Bevel 156 on leading angled edge 148 of object jumper 54''' is illustrated in this view.

In FIG. 12, looking from the opposite direction in the cross-sectional view, three teeth, 94, 92, and 126 are shown in alignment with angle cross ember 140''' of object jumper 54'''. Tooth 126 is bolted to horizontal support member 72 with bolts and nut combination 162 through horizontal plate 164 which is part of tooth 126 extending to the upper leg. All of the horizontal plates on the object jumpers 54 and teeth 70 extend from the same side of the unit. This facilitates installation as it is easy to attach one on one end and then simply work across horizontal support member 72 adding each tooth and object jumper across the units.

In FIG. 13, typical object jumper 54 is shown with front leading edge 148 angled upwardly and forwardly at a 45 degree angle. Leading edge 142 of cross member 140 is angled upwardly and to the rear at about a 40 degree angle. Horizontal panel 122 welded to the side at the lower edge of upper horizontal member 150 provides attachment through front to back elongated holes 134.

In FIG. 14, tooth 92 includes downward extending long arm 96 and horizontal short arm 100. The obtuse angle between the two arms is about 130 degrees. Horizontal panel connection plate 101 is welded to the side of the bottom edge of upper leg 100. Top surface edge 116 is flattened to receive the front end of horizontal grading rod 66. Tooth 92 is beveled on the side opposite of this view and the bevel is positioned when facing the tooth to the left. FIG. 15 includes bevel 164 which is angled to the right when facing the tooth. Other than the difference in the bevel, tooth 132 is identical to tooth 92 with upper leg 165 and horizontal connection plate 167.

In FIG. 16, horizontal support member 72 is configured to support two separate collection sets of teeth and object jumper members. Horizontal support member 72 is bolted to rail members 28 and 30 through holes 168. Holes 166', 166'', and 166''' are provided to receive bolts to attach object jumpers 54', 54'', and 54''' respectively. The opening for each collection set is stepped to the rear converging toward the center in a "V" shape. On the left side, holes 170 and holes 172 receive bolts to attach teeth 94 and 92 respectively. At the rear, holes 174 and 176 receive bolts to attach teeth 126 and 128 respectively, positioning these teeth side by side at the same distance rearwardly. Holes 178 and 180 on the right side receive bolts to attach teeth 130 and 132 respectively. The other steps and holes on member 72 that are not marked receive a second collection set of teeth and an object jumper.

I claim:

1. An apparatus for collecting shellfish from the ocean floor on a skid comprising a front, a rear, two opposite sides, and a pair of elongated runners positioned longitudinally along the opposite sides, the apparatus comprising
   at least one collection device on the skid, each device comprising:
   (i) a horizontal support plate member positioned laterally between the sides, and
   (ii) a plurality of teeth attached to and depending from the horizontal member, each tooth having a lower pointed end and an upper section, the teeth being angled downwardly and forwardly at an acute angle with respect to the runners, the teeth being positioned apart laterally across the device with each inner tooth being disposed a setback spacing rearwardly from its adjacent tooth to the outside, such that the horizontal position of the front ends of the teeth form a "V" shape,
   wherein the spacing between the teeth and the set back spacing to the rear is sufficient to allow smaller sized shellfish to pass between the teeth to the side and rear of each collection device, and
   wherein the plate member is of sufficient width to allow the teeth to be attached adjustably at positions front to rear.

2. The apparatus of claim 1 further comprising a grading device comprising a plurality of generally horizontal rod members, the length of the rod members positioned front to rear and disposed laterally in parallel relationship to each other, with front ends terminating at the upper sections of the teeth and rear ends terminating adjacent the rear of the skid, wherein the spacing between the rod members is sufficient to allow smaller sized shellfish to drop down between the rods.

3. The apparatus of claim 2 wherein horizontal rod members of the grading device are positioned at varying heights in a pattern of a plurality of rod members being at a higher height than the adjacent rod members.

4. The apparatus of claim 2 wherein horizontal rod members of the grading device are angled upwardly to the rear.

5. The apparatus of claim 2 wherein horizontal rod members of the grading device are attached to the apparatus and merely abut against the top section of the teeth.

6. The apparatus of claim 1 wherein the acute angle of the teeth with the runners is in the range of 35 to 45 degrees.

7. The apparatus of claim 1 wherein a leading edge of each angled tooth is beveled to direct the flow of sand toward the sides from each collection device.

8. The apparatus of claim 1 wherein there are six teeth in each collection device with two center teeth positioned side by side rearwardly.

9. The apparatus of claim 1 wherein the collection device further comprises at least one object jumping device comprising a structural member attached to and depending from the horizontal support plate member and a lead member with a leading edge attached to the structural member, with the leading edge being angled upwardly to the front and being positioned in front of and below the most frontwardly positioned tooth.

10. The apparatus of claim 9 wherein the object jumping device further comprises a structural member with a second leading edge angled parallel to and positioned to a side and forwardly of an adjacent tooth a similar distance as that between adjacent teeth.

11. The apparatus of claim 9 wherein attachment of the teeth and the object jumping device to the horizontal support member is detachable and adjustable front to rear.

12. The apparatus of claim 1 wherein the apparatus comprises at least two collection devices separated by an object jumping device and with an object jumping device positioned on each side, all attached to a single horizontal support member.

13. The apparatus of claim 1 wherein the minimum horizontal distance between the teeth is about two inches.

14. The apparatus of claim 1 wherein the apparatus further comprises a frame comprising a pair of longitudinal members positioned front to rear on the skid and resting on the skid with the horizontal support member structurally attached between the longitudinal members, and guide means attached to the skid that allows the frame to lift upwardly but prevents significant movement in other directions.

15. The apparatus of claim 1 wherein the teeth are generally of an "L" shape with an obtuse angle between the legs with the long leg beveled and sharpened to a leading edge and depending downwardly and forwardly to a point and the short leg positioned horizontally and with an upper surface abutting the forward end of the grading device rod members.

16. The apparatus of claim 1 wherein there is no lateral straight row of teeth spaced sufficiently close together to pick up shellfish.

17. An apparatus for collecting bivalve shellfish from the ocean floor comprising:
(a) a skid comprising a front, a rear, two opposite sides, and a pair of elongated runners positioned longitudinally along the opposite sides,
(b) at least one collection device on the skid, each device comprising:
(i) a horizontal support member positioned laterally between the sides, and
(ii) a plurality of teeth attached to and depending from the horizontal member, each tooth having a lower pointed end and an upper section, the teeth being angled downwardly and forwardly at an acute angle with respect to the runners, the teeth being positioned apart laterally across the device with each inner tooth being disposed a setback spacing rearwardly from its adjacent tooth to the outside, such that the horizontal position of the front ends of the teeth form a "V" shape,
wherein the spacing between the teeth and the set back spacing to the rear is sufficient to allow smaller sized shellfish to pass between the teeth to the side and rear of each collection device, and
wherein the plate member is of sufficient width to allow the teeth to be attached adjustably at positions front to rear, and
(c) a grading device comprising a plurality of generally horizontal rod members, the length of the rod members positioned front to rear and disposed laterally in parallel relationship to each other, with front ends terminating at the upper sections of the teeth and rear ends terminating adjacent the rear of the skid wherein the spacing between the rod members is sufficient to allow smaller sized shellfish to drop down between the rods.

18. The apparatus of claim 17 wherein the acute angle of the teeth with the runners is in the range of 35 to 45 degrees.

19. The apparatus of claim 17 wherein a leading edge of each angled tooth is beveled to direct the flow of sand toward the sides from each collection device.

20. The apparatus of claim 17 wherein there are six teeth in each collection device with two center teeth positioned side by side rearwardly.

21. The apparatus of claim 17 wherein the collection device further comprises at least one object jumping device comprising a structural member attached to and depending from the horizontal support member and a lead member with a leading edge attached to the structural member, with the leading edge being angled upwardly to the front and being positioned in front of and below the most frontwardly positioned tooth.

22. The apparatus of claim 21 wherein the object jumping device further comprises a structural member with a second leading edge angled parallel to and positioned to a side and forwardly of an adjacent tooth a similar distance as that between adjacent teeth.

23. The apparatus of claim 21 wherein attachment of the teeth and the object jumping device to the horizontal support member is detachable and adjustable front to rear.

24. The apparatus of claim 17 wherein the apparatus comprises at least two collection devices separated by an object jumping device and with an object jumping device positioned on each side, all attached to a single horizontal support member.

25. The apparatus of claim 17 wherein the closest horizontal distance between the teeth is about two inches.

26. The apparatus of claim 17 wherein the apparatus further comprises a frame comprising a pair of longitudinal members positioned front to rear on the skid and resting on the skid with the horizontal support member structurally attached between the longitudinal members, and guide means attached to the skid that allows the frame to lift upwardly but prevents significant movement in other directions.

27. The apparatus of claim 17 wherein horizontal rod members of the grading device are positioned at varying heights in a pattern of every other rod member being at a lower height than the adjacent rod members.

28. The apparatus of claim 17 wherein horizontal rod members of the grading device are angled upwardly to the rear.

29. The apparatus of claim 17 wherein horizontal rod members of the grading device are attached to the apparatus and merely abut against the top section of the teeth.

30. The apparatus of claim 17 wherein the teeth are generally of an "L" shape with an obtuse angle between the legs with the long leg beveled and sharpened to a leading edge and depending downwardly and forwardly to a point and the short leg positioned horizontally and with an upper surface abutting the forward end of the grading device rod members.

31. An apparatus for collecting shellfish from the ocean floor on a skid comprising a front, a rear, two opposite sides, and a pair of elongated runners positioned longitudinally along the opposite sides, the apparatus comprising:
  (a) a frame comprising a pair of longitudinal members positioned front to rear on the skid and resting on the skid and guide means attached to the skid that allows the frame to lift upwardly but prevents significant movement in other directions,
  (b) at least one collection device on the skid, each device comprising:
  (i) a horizontal support member attached to the frame laterally between the sides,
  (ii) a plurality of teeth attached to and depending from the horizontal member, each tooth having a lower end and an upper section, the teeth being angled downwardly and forwardly at an acute angle with respect to the runners, the teeth being positioned apart laterally across the device with each inner tooth being disposed a setback spacing rearwardly from its adjacent tooth to the outside, such that the horizontal position of the front ends of the teeth form a "V" shape,
  wherein the spacing between the teeth and the set back spacing to the rear is sufficient to allow smaller sized shellfish to pass between the teeth to the side and rear of each collection device, and
  wherein the plate member is of sufficient width to allow the teeth to be attached adjustably at positions front to rear, and
  (iii) at least one object jumping device comprising a structural member attached to and depending from the horizontal support member and a lead member with a leading edge attached to the structural member, with the leading edge being angled upwardly to the front and being positioned in front of and below the most frontwardly positioned tooth, and
  (c) a grading device comprising a plurality of generally horizontal rod members, the length of the rod members positioned front to rear and disposed laterally in parallel relationship to each other, with front ends terminating at the upper sections of the teeth and rear ends terminating adjacent the rear of the skid, wherein the spacing between the rod members is sufficient to allow smaller sized shellfish to drop down between the rods.

* * * * *